US008957561B2

(12) United States Patent
Sano et al.

(10) Patent No.: US 8,957,561 B2
(45) Date of Patent: Feb. 17, 2015

(54) ROTOR FOR ROTARY ELECTRIC MACHINE

(75) Inventors: Shinya Sano, Toyota (JP); Yuta Watanabe, Nishio (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 416 days.

(21) Appl. No.: 13/364,349

(22) Filed: Feb. 2, 2012

(65) Prior Publication Data

US 2012/0200188 A1 Aug. 9, 2012

(30) Foreign Application Priority Data

Feb. 3, 2011 (JP) ................................ 2011-021480

(51) Int. Cl.
*H02K 1/27* (2006.01)

(52) U.S. Cl.
CPC .................................... *H02K 1/2766* (2013.01)
USPC ............. 310/156.57; 310/156.07; 310/156.56

(58) Field of Classification Search
CPC ... H02K 1/276; H02K 1/2766; H02K 1/2773; H02K 21/14; H02K 21/16
USPC .............. 310/156.07, 156.53, 156.56, 156.57
See application file for complete search history.

(56) References Cited

U.S. PATENT DOCUMENTS

| | | | | |
|---|---|---|---|---|
| 7,800,271 | B2 * | 9/2010 | Komuro et al. | 310/156.53 |
| 2009/0134732 | A1 | 5/2009 | Shichijoh et al. | |
| 2009/0140592 | A1 * | 6/2009 | Rahman et al. | 310/156.53 |
| 2009/0140593 | A1 * | 6/2009 | Kaiser et al. | 310/156.53 |
| 2012/0200185 | A1 | 8/2012 | Sano et al. | |
| 2012/0200186 | A1 | 8/2012 | Sano et al. | |
| 2012/0200187 | A1 | 8/2012 | Sano et al. | |
| 2012/0200193 | A1 | 8/2012 | Sano et al. | |

FOREIGN PATENT DOCUMENTS

| | | | |
|---|---|---|---|
| CN | 101478212 | A | 7/2009 |
| JP | 2006-311772 | A | 11/2006 |
| JP | 2006314152 | A * | 11/2006 |
| JP | 2009-124899 | A | 6/2009 |
| JP | 2012-161226 | A | 8/2012 |
| JP | 2012-161227 | A | 8/2012 |
| JP | 2012-161228 | A | 8/2012 |
| JP | 2012-165480 | A | 8/2012 |
| JP | 2012-165481 | A | 8/2012 |
| WO | 2012/104715 | A1 | 8/2012 |

* cited by examiner

*Primary Examiner* — Burton Mullins
*Assistant Examiner* — Eric Johnson
(74) *Attorney, Agent, or Firm* — Sughrue Mion, PLLC

(57) ABSTRACT

A plurality of magnetic poles are disposed at intervals, in a circumferential direction, at an outer periphery of a rotor core. Each magnetic pole has a pair of permanent magnets disposed spaced apart from each other in the circumferential direction, and a magnetic flux suppression hole that suppresses flow of magnetic flux and that is formed extending on the inward side in the radial direction, between inner-periphery-side end portions of each permanent magnet. The magnetic flux suppression hole is formed of two first holes respectively communicating with magnet insertion holes into which the permanent magnets are inserted, and a second hole that is formed between the first holes with bridge portions interposed therebetween. An outer-periphery-side end portion of the second hole is positioned further outward than an imaginary straight line that passes through the inner-periphery-side end portions of the pair of permanent magnets.

10 Claims, 4 Drawing Sheets

ROTOR FOR ROTARY ELECTRIC MACHINE

INCORPORATION BY REFERENCE

The disclosure of Japanese Patent Application No. 2011-021480 filed on Feb. 3, 2011 including the specification, drawings and abstract is incorporated herein by reference in its entirety.

BACKGROUND OF THE INVENTION

1. Field of the Invention

The invention relates to a rotor for a rotary electric machine, and more particularly to a rotor for a rotary electric machine in which a plurality of permanent magnets are buried, at intervals in a circumferential direction, in the outer peripheral interior of a rotor core.

2. Description of Related Art

For example, Japanese Patent Application Publication No. 2009-124899 (JP-A-2009-124899) discloses a rotary electric machine 60 provided with a stator 602, at an inner periphery portion of which a stator coil is wound, and a rotor 62, of buried permanent magnet type, rotatably provided in the stator 602. The rotor 62 is made up of a rotary shaft (not shown) and a cylindrical rotor core 612 fixed thereto.

The above rotor core 612 is integrally constructed by crimping or the like after stacking magnetic steel sheets in the axial direction, each magnetic steel sheet being formed through punching into a circular ring-like shape. A plurality of magnetic poles are provided, equally spaced in the circumferential direction, on the outer periphery of the rotor core 612. FIG. 6 illustrates one magnetic pole in a state viewed from an axial-direction end face in an enlarged manner. FIG. 6 illustrates one magnetic pole 624, together with part of the stator 602, from among the members that are disposed evenly spaced (45°-angle intervals such that the central axis of a rotary shaft is the center of each fan shape) on the outer periphery of the rotor core 612 of the rotor 62.

A plurality of teeth 603 that point inwards in a radial direction are provided, at equal spacings in a circumferential direction, on the inner periphery of the stator 602. Slots 604 are respectively formed, in a number identical to that of the teeth 603, between mutually adjacent teeth, such that the slots 604 are opened on the inner periphery side and at both end portions in the axial direction. A stator coil (not shown) that is wound around the teeth 603 is inserted into the slots 604. As a result, a rotating magnetic field that rotationally drives the rotor 62 is formed inwards of the stator 602 when the stator coil is energized.

Each magnetic pole 624 provided in the rotor core 612 has a pair of permanent magnets 626, disposed so that a mutual spacing widens towards an outer peripheral face 613, and a magnetic flux suppression hole 628 that is formed, on the inward side in the radial direction, between inner-periphery-side end portions of the permanent magnet 626. The magnetic flux suppression hole 628 is made up of three holes **628*a*, 628*b*. Two end holes 628*a* having substantially triangular shapes are formed each communicating with a respective magnet insertion hole 632 through which there is inserted a respective permanent magnet 626 having an end face shape (and cross-section shape) that is an elongated rectangular shape. A substantially rectangular central hole 628*b* is formed between the two end holes 628*a* with bridge portions 636 interposed therebetween, which are thin core regions. The outer-periphery-side end portions of the three holes 628*a*, 628*b* are formed so as to run along an imaginary straight line that passes through the corners (or end portions), on the inward side of the circumferential direction, of the pair of permanent magnets 626**.

Herein, the above publication indicates that, in the rotary electric machine 60 provided with the rotor 62 having such magnetic poles 624, reluctance torque is enhanced as a result of an increase of the difference between q-axis inductance Lq and d-axis inductance Ld in the magnetic poles 624, by forming the magnetic pole suppression hole 628 having a void in the center, on the inward side in the radial direction, in each magnetic pole 624.

In the magnetic poles 624 of the rotor 62 of JP-A-2009-124899, there is formed, as a magnetic path region 638, a core portion that is surrounded, on three sides, by the pair of permanent magnets 626 and the magnetic flux suppression hole 628. In the magnetic path region 638, however, the vicinity of the outer-periphery-side end portion of the central hole **628*b* is a region in which there flows hardly any magnet magnetic flux from the permanent magnet 626, or q-axis magnetic flux (dotted line in FIG. 6) that flows from the teeth 603 of the stator 602 through the rotor core 612**. There is thus room for improvement in terms of utilizing this region more effectively.

SUMMARY OF THE INVENTION

The invention provides a rotor for a rotary electric machine that affords enhanced torque through a reduction in d-axis inductance in magnetic poles, without causing magnetic saturation in the magnetic poles.

A rotor for a rotary electric machine according to an aspect of the invention is a rotor for a rotary electric machine, having a rotor core in which a plurality of magnetic poles are provided at intervals, in a circumferential direction of the rotor core, at an outer periphery of the rotor core in a radial direction, wherein each of the magnetic poles has a pair of permanent magnets disposed spaced apart from each other in the circumferential direction, and a magnetic flux suppression hole that suppresses flow of magnetic flux and that is formed, between inner-periphery-side end portions of the permanent magnets, in the radial direction, such that the magnetic flux suppression hole extends inwards in the radial direction; the magnetic flux suppression hole has two first holes respectively communicating with magnet insertion holes into which the permanent magnets are inserted, and a second hole that is formed between the first holes with bridge portions interposed between the second hole and the first holes; and an outer-periphery-side end portion of the second hole in the radial direction is positioned further outward in the radial direction than an imaginary straight line that passes through the inner-periphery-side end portions of the pair of permanent magnets.

By virtue of a configuration wherein in a magnetic flux suppression hole that is formed so as to extend on the inward side in the radial direction between inner-periphery-side end portions of a pair of permanent magnets in each magnetic pole, an outer-periphery-side end portion of the second hole is positioned further outward than an imaginary straight line that passes through the inner-periphery-side end portions of the pair of permanent magnets; as a result, it becomes possible to lower the d-axis inductance Ld of the magnetic poles, without affecting the flow of q-axis magnetic flux across a magnetic path region that is surrounded, on three sides, by the pair of permanent magnets and the magnetic flux suppression hole. In consequence, this allows increasing the reactance torque, which increases proportionally to the difference between q-axis inductance Lq and d-axis inductance Ld.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described in detail below with reference to accompanying drawings. In the description below, specific forms, materials, numerical values, directions and so forth are merely examples for facilitating comprehension of the invention, and can be appropriately modified depending on the intended application, purpose, specifications and the like.

Figure 1:
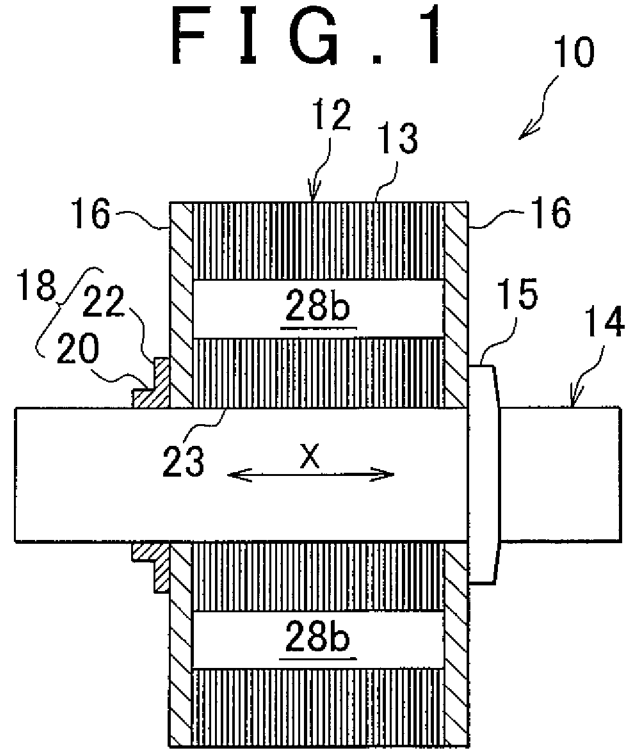
FIG. 1 is a longitudinal section taken along the axial direction of a rotor for a rotary electric machine in an embodiment of the invention.

FIG. 1 illustrates a longitudinal section along the axial direction of a rotor 10 for a rotary electric machine (hereafter also simply referred as rotor) of the embodiment. A tubular stator 2 is provided around the rotor 10, with a predetermined gap left therebetween (see FIG. 3). A plurality of teeth 3 that point inwards in a radial direction is provided, at equal spacings in a circumferential direction, on the inner periphery of the stator 2. Slots 4 are respectively formed, in a number identical to that of the teeth 3, between mutually adjacent teeth, such that the slots 4 are opened on the inner periphery side and at both ends in the axial direction. A stator coil (not shown) that is wound around the teeth 3, is inserted into the slots 4. As a result, a rotating magnetic field that rotationally drives the rotor 10 is formed inwards of the stator 2 when the stator coil is energized.

The rotor 10 includes: a rotor core 12, of cylindrical shape or of cylindrical shape having a shaft hole 23 in a central portion in the radial direction; a shaft 14 that is passed through the shaft hole 23 of the rotor core 12 and fixed; end plates 16 that are disposed in contact with the rotor core 12, on both ends of the latter, in the axial direction of the shaft 14 (and of the rotor core 12) denoted by arrow X; and a fixing member 18 that fixes the rotor core 12 and an end plate 16 to the shaft 14.

The rotor core 12 is configured through stacking, in the axial direction, of multiple magnetic steel sheets that are each formed through punching, into a circular ring-like shape, of, for example, 0.3 mm-thick silicon steel sheets or the like. The magnetic steel sheets that make up the rotor core 12 are integrally joined to each other by methods that involve crimping, bonding, welding or the like, all sheets collectively or by dividing the rotor core 12 into a plurality of blocks in the axial direction. A plurality of magnetic poles are provided, at equal spacings in the circumferential direction, on the rotor core 12. As explained in detail below, each magnetic pole has a plurality of permanent magnets and a magnetic flux suppression hole. The circumferential direction position of the rotor core 12 on the shaft 14 is determined by fixing through interference fitting, or by key fitting.

The shaft 14 is formed from a round steel bar. A flange portion 15 is formed on the outer periphery of the shaft 14, such that the flange portion 15 projects outwards in the radial direction. The flange portion functions as a stopper that determines the axial direction position of the rotor core 12 on the shaft 14, through abutment against an end plate 16 during assembly of the rotor 10.

Each end plate 16 is made up of a disc having substantially the same outer shape as that of the axial-direction end face of the rotor core 12. More preferably, the end plates 16 are made of a non-magnetic metal material, for example aluminum, copper or the like. A non-magnetic metal material is used herein for the purpose of suppressing the short circuit of magnetic flux at the axial-direction end portion of the permanent magnets that make up the magnetic poles. Provided that the material thereof is a non-magnetic material, the end plates 16 are not limited to a metal material, and may be formed out of a resin material.

The end plates 16 provided on both sides of the rotor core 12 in the axial direction have, for example, a function of pressing the rotor core 12 from both ends, a function of correcting unbalance in the rotor 10 arising from partial cutting work after assembly of the rotor 10, and a function of preventing that the permanent magnets, which make up the magnetic poles, should come off the rotor core 12 in the axial direction.

In the embodiment the end plates 16 are explained and depicted in the figures as having substantially the same diameter as the rotor core 12. However, the diameter of the end plates 16 may be for example made smaller, or the end plates 16 may be omitted, to cut costs, in a case where, for example, the permanent magnets that make up the magnetic poles are fixed in the rotor core by way of a resin or the like.

The fixing member 18 has a crimp portion 20 of cylindrical shape, and a pressing portion 22 that protrudes outwards in the radial direction from one end portion of the crimp portion 20. The fixing member 18 is fixed to a shaft 14 through crimping of the crimp portion 20 against the shaft 14, in a state where the rotor core 12 and the two end plates 16 are pressed again the flange portion 15 by the pressing portion 22 of the fixing member 18. As a result, the rotor core 12 is fixed, together with the end plates 16, to the shaft 14.

Figure 2:
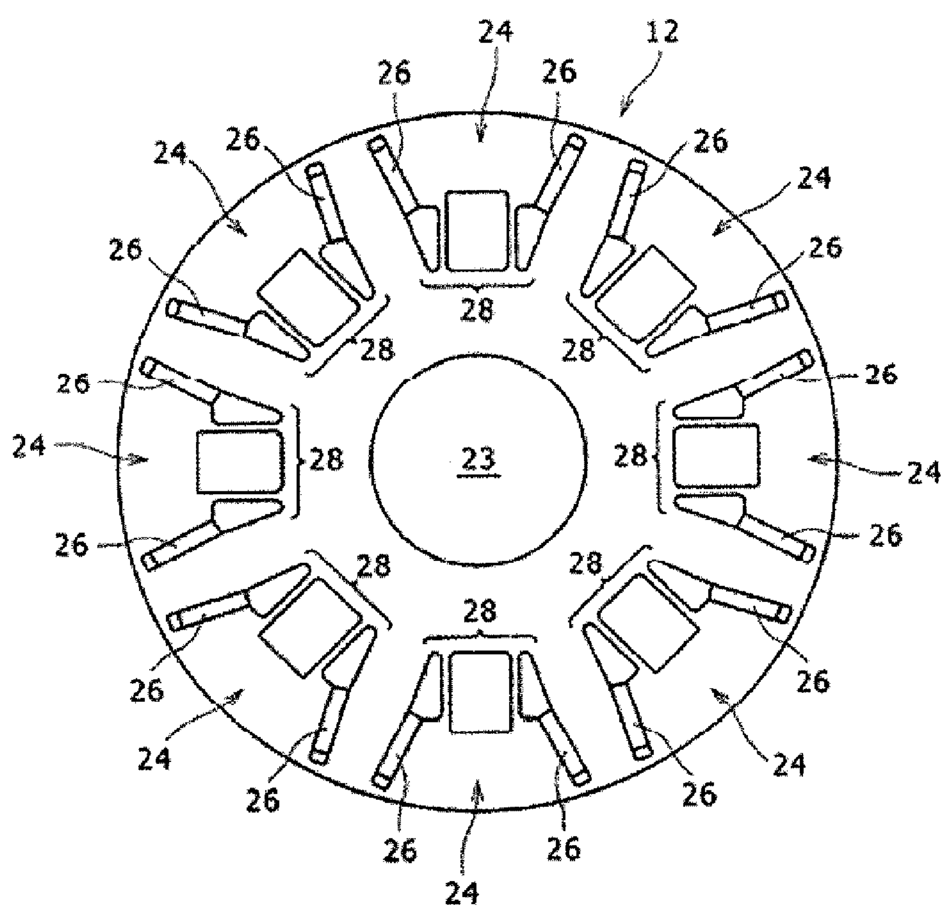
FIG. 2 is a diagram illustrating an axial-direction end face of a rotor core in the rotor illustrated in FIG. 1.
Figure 3:
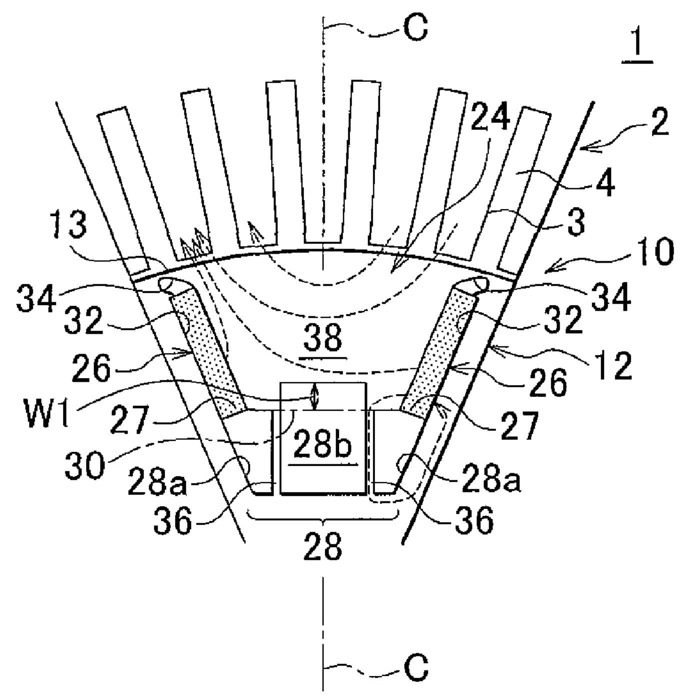
FIG. 3 is a partially enlarged view illustrating one magnetic pole in FIG. 2, together with part of a stator.

A configuration of the rotor core 12 is explained next with reference to FIGS. 2 and 3. FIG. 2 illustrates an axial-direction end face of a rotor core 12, but the configuration of cross sections that are perpendicular to the axial direction of the rotor core 12 is identical to that in the figure. FIG. 3 is a diagram illustrating an enlarged view of one magnetic pole 24 in FIG. 2, together with part of the stator 2.

The shaft hole 23, for insertion and fixing of the shaft 14, is formed through the central portion of the rotor core 12 having a cylindrical outer shape. In a case where the rotor core 12 is fixed to the shaft 14 by interference fitting, the shaft hole 23 is circular and no key is formed at the edge portion thereof, as illustrated in FIG. 2. If the rotor core 12 is attached to the shaft 14 by key fitting, a key (or key groove) is protrusively provided (or recessedly provided) at an edge portion of the shaft hole 23.

A plurality of magnetic poles 24 are provided, equally spaced in the circumferential direction, on the outer periphery of the rotor core 12. In the embodiment, an example is illustrated in which eight magnetic poles 24 are provided at 45° spacings in the circumferential direction. Each magnetic pole 24 has the same configuration, except for the magnetization direction of the permanent magnets 26. Therefore, just one magnetic pole 24 will be described below.

The magnetic pole 24 has a pair of permanent magnets 26 and a magnetic flux suppression hole 28. The pair of permanent magnets 26 are buried in the interior of the rotor core 12, in the vicinity of an outer peripheral face 13. As illustrated in FIG. 3, the two permanent magnets 26 in the magnetic pole 24 have the same shape and size. That is, each permanent magnet 26 has axial-direction end faces (and a cross-section perpendicular to the axial direction) of elongated rectangular shape, each end face having two short sides and two long sides, the permanent magnets 26 being formed to have an axial-direction length substantially identical to that of the rotor core 12. However, the configuration is not limited to the above-described one, and for example, one of the shape and size may be dissimilar between two permanent magnets 26.

The pair of permanent magnets 26 in the magnetic pole 24 are inserted into respective magnet insertion holes 32, to be fixed and buried. As a result, the two permanent magnets 26 are disposed in the form of a substantially V shape, or the kanji character representing "eight", in which a mutual spacing widens towards the outer peripheral face 13 of the rotor core 12. In other words, the pair of permanent magnets 26 are disposed in such a manner that a mutual spacing becomes narrower towards the inner periphery. The pair of permanent magnets 26 are disposed on both sides with respect to a magnetic pole centerline C, which is a radial direction line that passes through a center position of the magnetic pole in the circumferential direction. However, the configuration is not limited to the above-described one, and the pair of permanent magnets 26 may be disposed non-symmetrically with respect to the magnetic pole centerline C.

The permanent magnets 26 are inserted into the magnet insertion holes 32 that are formed in the rotor core 12 so as to extend in the axial direction thereof, and are fixed for example by means of a thermosetting resin that is injected into the narrow gaps formed between the hole inner wall face and the long-side lateral face of the permanent magnets 26. The permanent magnets 26 are disposed in a position such that the long-side lateral faces thereof extend substantially along the radial direction of the rotor core 12.

A pocket portion 34 that communicates with each magnet insertion hole 32 is formed at the outer periphery side of each magnet insertion hole 32. Each pocket portion 34 is formed extending in the axial direction along the short-side lateral face of each permanent magnet 26. Each pocket portion 34 has, in the interior thereof, a void or resin having a lower permeability than that of the magnetic steel sheets. Therefore, the pocket portions 34 have the function of suppressing the short circuit of magnetic flux at the outer-periphery-side end portions of the permanent magnets 26, in the long-side direction. The resin for fixing the permanent magnets 26 may be injected, via the pocket portions 34, between the inner wall face of the magnet insertion hole 32 and the long-side lateral faces of the permanent magnets 26.

The magnetic flux suppression hole 28 is formed at a position on the inwards side in the radial direction (bottom of FIG. 3), between inner-periphery-side end portions 27 of the two permanent magnets 26 in each magnetic pole 24. The magnetic flux suppression hole 28 has, in the interior thereof, a void (or resin) of lower permeability than that of the magnetic steel sheets. Therefore, the magnetic flux suppression hole 28 has the function of suppressing or regulating the flow of magnetic flux generated by the permanent magnets 26, and the flow of magnetic flux from the stator 2 that penetrates into the rotor core 12.

In the embodiment, the magnetic flux suppression hole 28 is made up of two first holes **28*a* and one second hole 28*b*. The first holes 28*a* are formed communicating with the inner-periphery-side end portion of the magnet insertion holes 32 through which the permanent magnets 26 are inserted. The first holes 28*a* are at positions symmetrical with respect to the magnetic pole centerline C and formed so as to have mirror-symmetrical substantially triangular shapes with respect to the magnetic pole centerline C. The first holes 28*a* have, in the interior thereof, a void (or resin) of lower permeability than that of the magnetic steel sheets, and hence the first holes 28*a* have the function of suppressing the short circuit and leaks of magnetic flux at the inner-periphery-side end portions 27 of the permanent magnets 26, in the long-side direction. The resin for fixing the permanent magnet 26 may be injected into the magnet insertion holes 32 via the first holes 28*a***.

A substantially rectangular second hole **28*b* is formed between the first holes 28*a*, with bridge portions 36 interposed between the second hole 28*b* and the first holes 28*a*. The second hole 28*b* is opposed to the outer peripheral face 13 at a middle position between two permanent magnets 26 in the circumferential direction. The second hole as well has, in the interior thereof, a void (or resin) of lower permeability than that of the magnetic steel sheets. Therefore, the second hole 28*b* has the function of orienting the magnetic flux generated at the opposing face side of the pair of permanent magnets 26 towards the outer periphery, and has also the function of regulating the flow (dotted line in FIG. 3) of q-axis magnetic flux from the stator 2 that flow substantially along a circular arc, through the magnetic path region 38, between the pair of permanent magnets 26**.

The outer-periphery-side end portion of the second hole **28*b* that is part of the magnetic flux suppression hole 28 is positioned further outward in the radial direction than an imaginary straight line 30 that passes through the inner-periphery-side end portions or inner-periphery-side corners of the pair of permanent magnets 26. The outer-periphery-side end portions of the first holes 28*a*, by contrast, are positioned on the imaginary straight line 30. Accordingly, the second hole 28*b* is formed so that the outer-periphery-side end portion of the second hole 28*b* is positioned further outward than the outer-periphery-side end portions of the first holes 28*a*, by a width W1**, towards the outer periphery.

The extended portion of the second hole **28*b* that extends towards the outer periphery by the jutting width W1 can be considered to be a region of substantially no flow of q-axis magnetic flux, within the magnetic path region 38 that is surrounded on three sides by the pair of permanent magnets 26 and the magnetic flux suppression hole 28, i.e. can be considered to be a region that was not effectively utilized. Therefore, the d-axis inductance Ld of the magnetic pole 24 can be reduced, without affecting the flow of q-axis magnetic flux, through extension of the second hole 28*b* of the magnetic flux suppression hole 28**, as described above. In consequence, this allows increasing the reactance torque, which increases proportionally to the difference between q-axis inductance Lq and d-axis inductance Ld.

Extending thus the second hole **28*b* of the magnetic flux suppression hole 28 allows reducing the core region, thereby reducing the weight of the rotor core 12. As a result, the torque is advantageously enhanced, and the width of the bridge portions 36** is reduced.

In the example of FIG. 3, an example is explained wherein the outer-periphery-side end portion of the first holes **28*a* is positioned on an imaginary straight line 30, but the configuration is not limited thereto, and the first holes 28***a* may also be extended toward the outer periphery, in the same way as the second hole 28*b*. In this case, the jutting width of the first holes 28*a* may be set to be smaller than the jutting width W1 of the second hole 28*b*, or to be identical to that of the jutting width W1 of the second hole 28*b*.

A modification of the above embodiment is explained next with reference to FIG. 4.

Figure 4:
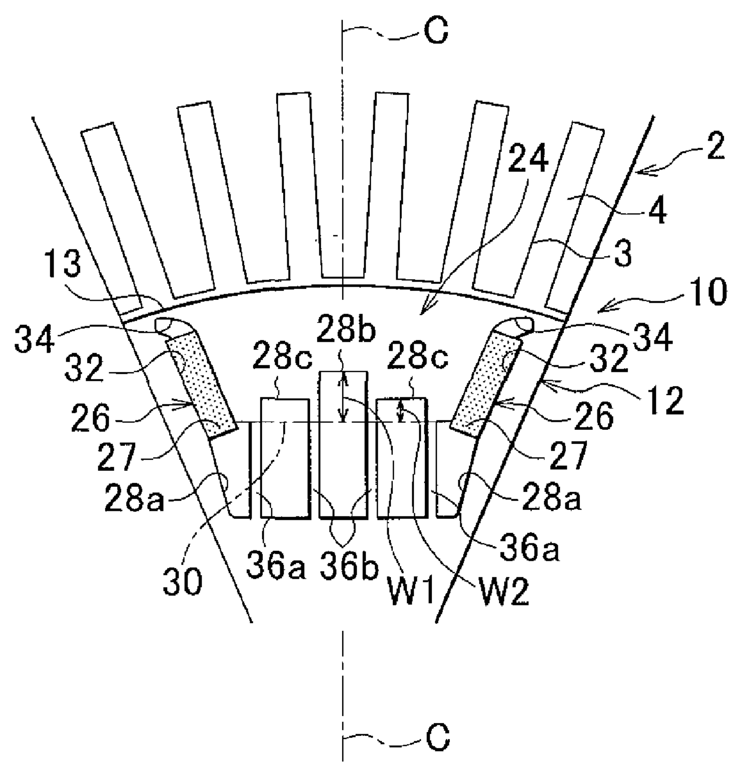
FIG. 4 is a diagram illustrating an example in which a second hole of a magnetic flux suppression hole in FIG. 2 is divided into a plurality of holes in a circumferential direction.

FIG. 4 illustrates an example in which the second hole 28*b* of the magnetic flux suppression hole 28 that makes up the magnetic pole 24 is made up of a plurality of holes. In this example, the second hole 28*b* is split into three holes in the circumferential direction. That is, the second hole includes a central hole 28*d* corresponding to the center of the magnetic pole, and circumferential direction side holes 28*c* that are adjacent to the central hole 28*d* with bridge portions 36*b* interposed between the central hole 28*d* and the circumferential direction side holes 28*c*, on both sides of the central hole 28*d* in the circumferential direction. In this case, a jutting width W2 of the circumferential direction side holes 28*c* is set to be smaller than the jutting width W1 of the central hole 28*d*, but the configuration is not limited thereto, and the jutting widths of the central hole 28*d* and of the circumferential direction side holes 28*c* may be set to be identical. A rotor having the magnetic poles 24 of this example brings about the same effects as those achieved by the embodiment described above. In addition, increasing the number of bridge portions per magnetic pole allows enhancing the centrifugal resistance strength and torque resistance strength of the magnetic poles 24.

Figure 5:
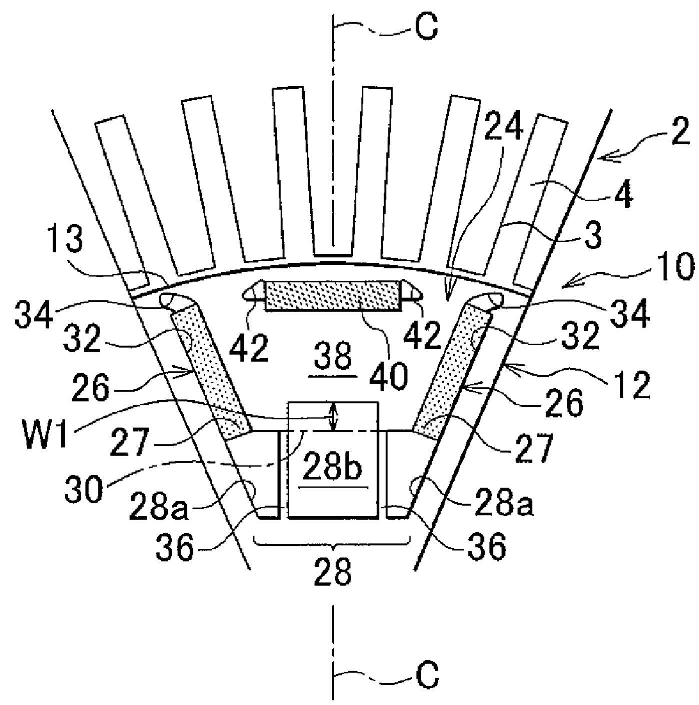
FIG. 5 is a diagram illustrating an example in which another permanent magnet is disposed between a pair of permanent magnets.
Figure 6:
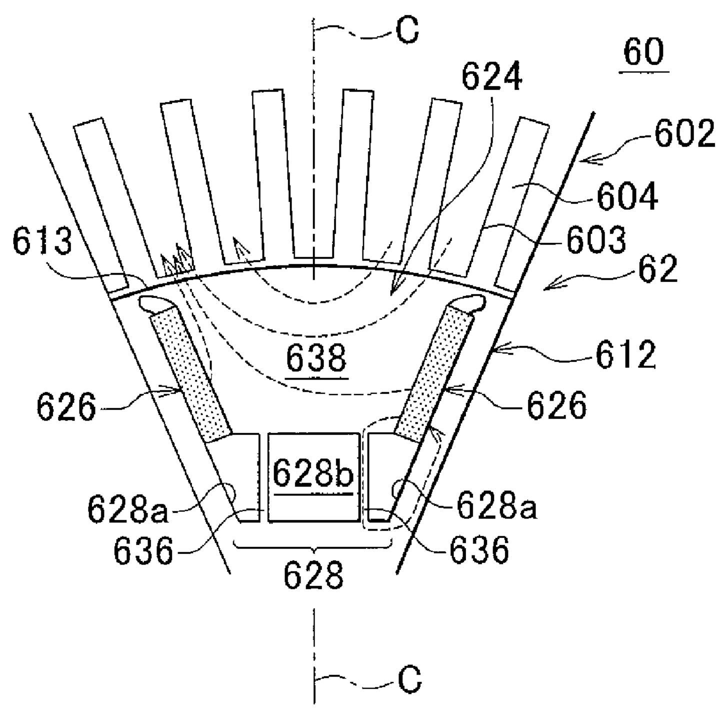
FIG. 6 is a partially enlarged view illustrating a conventional example of a magnetic pole having a pair of permanent magnets and a magnetic flux suppression hole.

Examples have been explained above in which each magnetic pole is made up of two permanent magnets, but the invention is not limited thereto. As illustrated in FIG. 5, for example, a separate permanent magnet 40 may be included in addition to the pair of permanent magnets 26. In this case, the permanent magnet 40 is disposed in the rotor core 12 substantially along the circumferential direction, in the vicinity of the outer peripheral face 13. As a result, a magnetic path region 38 having substantially a U-shape or circular arc-shape is formed between the permanent magnet 40, the pair of permanent magnets 26, and the magnetic flux suppression hole 28.

In the rotor for a rotary electric machine according to the invention, the second hole may have a central hole corresponding to a center of each magnetic pole in the circumferential direction, and circumferential direction side holes that are positioned on both sides of the central hole in the circumferential direction; and a jutting width of the central hole towards the outer periphery in the radial direction is set to be greater than a jutting width of the circumferential direction side holes.

In the rotor for a rotary electric machine according to the invention, the pair of permanent magnets may be disposed, at positions spaced apart from each other in the circumferential direction, in a position substantially along the radial direction; and a separate permanent magnet may be disposed substantially along an outer peripheral face of the rotor core, between the pair of permanent magnets, in the vicinity of the outer peripheral face.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A rotor for a rotary electric machine, comprising:

a rotor core in which a plurality of magnetic poles are provided at intervals, in a circumferential direction of the rotor core, at an outer periphery of the rotor core in a radial direction, wherein each of the magnetic poles has a pair of permanent magnets disposed spaced apart from each other in the circumferential direction, and a magnetic flux suppression hole that suppresses flow of magnetic flux and that is formed, between inner-periphery-side end portions of the permanent magnets, in the radial direction, such that the magnetic flux suppression hole extends inwards in the radial direction;

the magnetic flux suppression hole has two first holes respectively communicating with magnet insertion holes into which the permanent magnets are inserted, and a second hole that is formed between the first holes with bridge portions interposed between the second hole and the first holes; and an outer-periphery-side end portion of the second hole in the radial direction is positioned further outward in the radial direction than an imaginary straight line that passes through the inner-periphery-side end portions of the pair of permanent magnets, only two bridge portions are provided between the two first holes and the second hole, respectively, each of outer-periphery-side end portions of the first holes and the outer-periphery-side end portion of the second hole is formed in a straight line shape parallel to the direction of the imaginary straight line, and each of the bridge portions are offset from each of the inner-periphery-side end portions of the pair of permanent magnets to a side of a magnetic pole centerline, which is a radial direction line that passes through a center position of the magnetic pole in the circumferential direction.

2. The rotor for a rotary electric machine according to claim 1, wherein each of the pair of permanent magnets has a flat shape.

3. The rotor for a rotary electric machine according to claim 2, wherein a cross section, perpendicular to an axial direction of the rotor core, of each of the pair of permanent magnets, has an elongated rectangular shape.

4. The rotor for a rotary electric machine according to claim 2, wherein a longitudinal direction of each of the pair of permanent magnets is disposed substantially along the radial direction.

5. The rotor for a rotary electric machine according to claim 1, wherein the second hole has a central hole corresponding to a center of each magnetic pole in the circumferential direction, and circumferential direction side holes that are positioned on both sides of the central hole in the circumferential direction; and a jutting width of the central hole towards the outer periphery in the radial direction is set to be greater than a jutting width of the circumferential direction side holes.

6. The rotor for a rotary electric machine according to claim 1, wherein the pair of permanent magnets are disposed, at positions spaced apart from each other in the circumferential direction, in a position substantially along the radial direction; and a separate permanent magnet is disposed substantially along an outer peripheral face of the rotor core, between the pair of permanent magnets, in the vicinity of the outer peripheral face.

7. The rotor for a rotary electric machine according to claim 6, wherein each of the pair of permanent magnets and the separate permanent magnet has a flat shape.

8. The rotor for a rotary electric machine according to claim 7, wherein a cross section, perpendicular to an axial direction of the rotor core, of each of the pair of permanent magnets and the separate permanent magnet has an elongated rectangular shape.

9. The rotor for a rotary electric machine according to claim 7, wherein a longitudinal direction of each of the pair of permanent magnets is disposed substantially along the radial direction.

10. The rotor for a rotary electric machine according to claim 7, wherein a position of the separate permanent magnet in the radial direction is substantially identical to a position, in the radial direction, of the outer-periphery-side end portions of the pair of permanent magnets in the radial direction.

* * * * *